(12) United States Patent
Schalig et al.

(10) Patent No.: US 11,682,100 B2
(45) Date of Patent: *Jun. 20, 2023

(54) DYNAMIC ALLOCATION OF SYSTEM OF CHIP RESOURCES FOR EFFICIENT SIGNAL PROCESSING

(71) Applicant: NVIDIA Corporation, Santa Clara, CA (US)

(72) Inventors: David Schalig, San Francisco, CA (US); Karsten Patzwaldt, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,745

(22) Filed: Mar. 29, 2022

(65) Prior Publication Data
US 2022/0222769 A1 Jul. 14, 2022

Related U.S. Application Data

(63) Continuation of application No. 16/559,475, filed on Sep. 3, 2019, now Pat. No. 11,321,798.
(Continued)

(51) Int. Cl.
*G06T 1/20* (2006.01)
*G06F 9/50* (2006.01)
(Continued)

(52) U.S. Cl.
CPC ................ *G06T 1/20* (2013.01); *G06T 5/002* (2013.01); *G06T 5/50* (2013.01); *G06F 9/5066* (2013.01)

(58) Field of Classification Search
CPC .......... Y02D 10/00; G06T 1/20; G06T 5/002; G06T 5/50; G06T 9/40; G06T 11/206;
(Continued)

(56) References Cited

U.S. PATENT DOCUMENTS 8,605,089 B1 12/2013 Heckerman et al.
10,397,094 B2 8/2019 Karthikeyan et al.
(Continued)

FOREIGN PATENT DOCUMENTS

CN 105103504 A 11/2015
CN 107846371 A 3/2018
(Continued)

*Primary Examiner* — Jacinta M Crawford
(74) *Attorney, Agent, or Firm* — Taylor English Duma L.L.P,

(57) ABSTRACT

In various examples, a signal processing pipeline is dynamically generated or instantiated for a signal processing request. To generate the pipeline, a graph topology—including nodes and edges—may be created to represent features, functionality, and characteristics of a signal processing system. The nodes, representing processing tasks, may be connected via edges having associated costs for performing, by a node, a processing task on an output of a prior or edge-connected node. For a given signal processing request, the nodes or processing tasks to be included may be selected and, using a graph routing algorithm and the costs between and among the determined nodes, a path through the nodes may be determined—thereby defining, at least in part, the signal processing pipeline.

20 Claims, 8 Drawing Sheets

Related U.S. Application Data

(60) Provisional application No. 62/884,297, filed on Aug. 8, 2019.

(51) Int. Cl.
*G06T 5/00* (2006.01)
*G06T 5/50* (2006.01)

(58) Field of Classification Search
CPC ....... G06T 17/005; G06F 9/48; G06F 9/5044; G06F 9/5066
USPC .......................................... 345/501; 718/104
See application file for complete search history.

(56) References Cited

U.S. PATENT DOCUMENTS

| | | |
|---|---|---|
| 2009/0007127 A1 | 1/2009 | Roberts et al. |
| 2014/0359563 A1 | 12/2014 | Xie et al. |
| 2015/0091916 A1 | 4/2015 | Park et al. |
| 2018/0357329 A1 | 12/2018 | Meyer et al. |

FOREIGN PATENT DOCUMENTS

| | | |
|---|---|---|
| CN | 108040121 A | 5/2018 |
| CN | 109669768 A | 4/2019 |
| WO | 2012/114747 A1 | 8/2012 |

DYNAMIC ALLOCATION OF SYSTEM OF CHIP RESOURCES FOR EFFICIENT SIGNAL PROCESSING

CROSS-REFERENCE TO RELATED APPLICATIONS

This application claims the benefit of U.S. Provisional application Ser. No. 16/559,475, filed on Sep. 3, 2019, which claims the benefit of U.S. Provisional Application No. 62/884,297, filed on Aug. 8, 2019. Each of these applications is incorporated herein by reference in its entirety.

BACKGROUND

Signal processing relies on processing pipelines for converting data generated by sensors to processed or modified data that may be used in a variety of applications. With respect to image processing, pipelines for image data generated by image sensors may be used to convert a captured, raw image to a different format (e.g., Bayer to YUV). For example, when image data is processed—depending on the image data type and image parameters indicated in an image processing request—the image data may go through any number of processing tasks (e.g., demosaicing, noise reduction, scaling, lens shading, etc.) as a defined pipeline, or process route. As a result, the captured image may be converted or processed through the process route to generate a processed image that may be of a different image quality, data type, and/or scale as the captured image.

However, conventional systems use fixed processing pipelines for converting captured sensor data to a processed sensor data of a predefined type. As such, when a signal processing request requires a different type of processed sensor data, the same fixed processing pipeline must be used, which may not perform adequately for that particular processed sensor data type—e.g., the quality may be below expectations. In addition, even where the existing fixed processing pipeline may generate a particular processed sensor data type, the fixed processing pipeline may not do so efficiently—e.g., excess power may be used, run-time may be increased, and/or memory usage may exceed availability—because the order of the processing tasks within the fixed processing pipeline may not be efficient.

SUMMARY

Embodiments of the present disclosure relate to dynamic allocation of system on chip (SoC) resources for efficient signal processing. Systems and methods are disclosed that use graph routing algorithms to determine an efficient path through a plurality of nodes each representing a respective processing task—with the path at least partially defining a signal processing pipeline. A number of discrete hardware components may be used in a signal processing architecture for executing the dynamically instantiated signal processing pipelines. As such, in contrast to conventional systems, because the signal processing pipeline may be dynamic, the path through the signal processing pipeline—and thus to the discrete hardware components—may also be dynamic or adjustable.

In order to determine a signal processing pipeline for a given signal processing request, the hardware and software topology, capabilities, and limitations of the system may be modeled as a graph. A signal processing request may include an indication of a capture data type, a processed or output data type, required processing steps (e.g., high-dynamic-range (HDR) or denoising in image applications), an output data size, and/or the like. As such, based on the signal processing request, nodes of the graph corresponding to the different hardware and/or software that may be used to execute the processing on the captured signal may be determined. Costs between the various determined nodes, in addition to, in some embodiments, additional criteria (e.g., user-specified criteria such as run-time, power usage, memory bandwidth, image quality, and/or the like) may be used by a graph routing algorithm to determine an efficient path through the determined nodes. Once the path is determined, the path may be used to define a signal processing pipeline for the signal processing request. This process may be repeated for any number of signal processing requests, where different instantiations of signal processing pipelines may be generated depending on the various costs, additional criteria, and/or determined nodes. As such, and different from conventional systems, a route through the discrete hardware components may differ on a request by request basis, thereby providing a dynamic and efficient method of signal processing capable of decreasing run-time, reducing memory and power usage, and tailoring output data quality to specified standards.

BRIEF DESCRIPTION OF THE DRAWINGS

The present systems and methods for dynamic allocation of system on chip (SoC) resources for efficient signal processing are described in detail below with reference to the attached drawing figures, wherein.

DETAILED DESCRIPTION

Figure 1A:
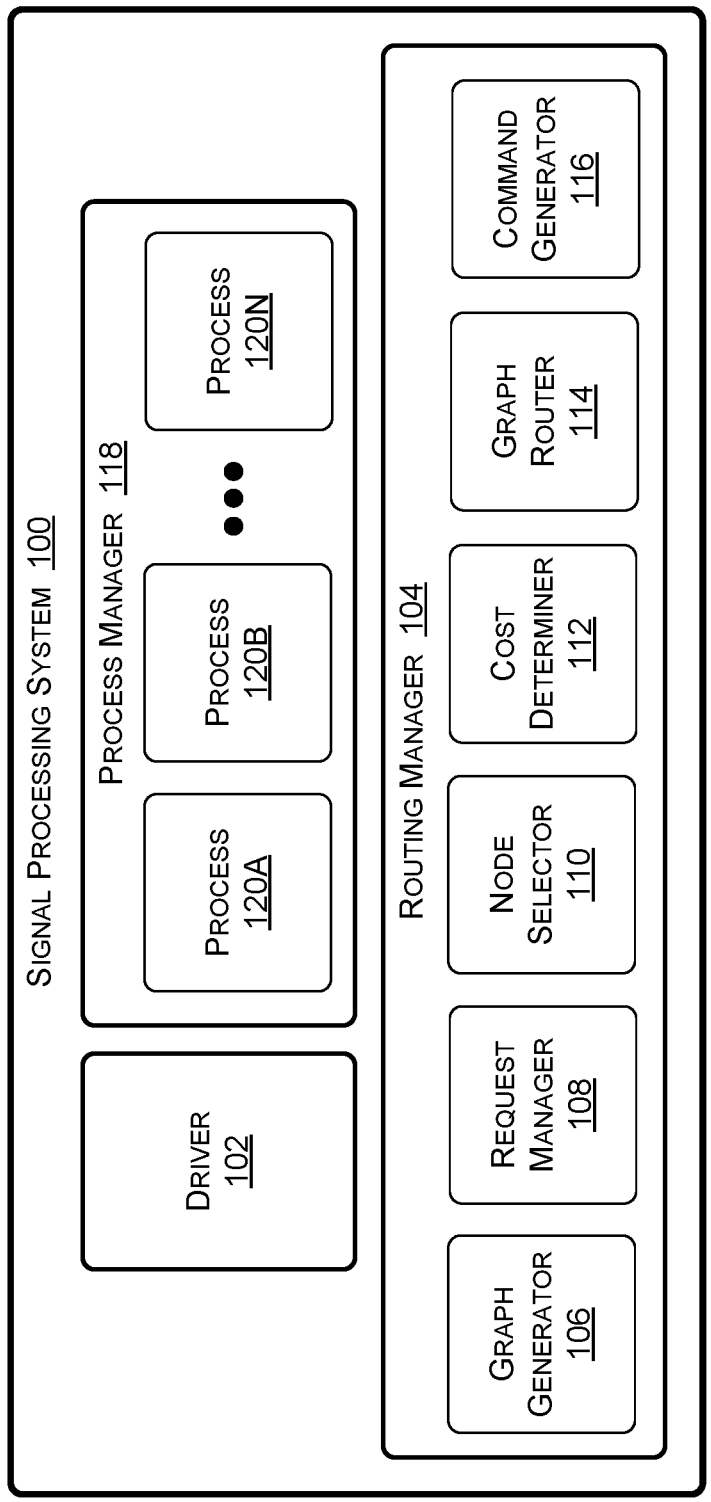
FIG. 1A is an example signal processing system, in accordance with some embodiments of the present disclosure.

Systems and methods are disclosed related to dynamic allocation of system on chip (SoC) resources for efficient signal processing. Although primarily described herein with respect to image processing, this is not intended to be limiting. For example, the systems and methods of the present disclosure may be implemented for any signal processing application, including—but not limited to—audio signal processing, speech signal processing, image processing, video processing, wireless communication signal processing, control systems signal processing, array processing, process control signal processing, seismology signal processing, medical device or imaging signal processing, financial signal processing, feature extraction signal processing, quality improvement signal processing (e.g., noise reduction, image enhancement, echo cancellation, etc.), source coding signal processing (e.g., audio compression, image compression, video compression, etc.), genomics signal processing, and/or other signal processing types.

In contrast to conventional approaches, such as those described herein, the present disclosure describes a dynamically optimized processing pipeline that may be used to process sensor data. For example, a number of discrete hardware components may be used in a signal processing architecture for executing the processing pipeline, where each hardware component may be configured to perform a respective processing task (e.g., noise reduction, demosaicing, lens shading, high-dynamic-range (HDR) shading, scaling, speech synthesis, echo cancellation, etc.). Because the processing pipeline may not be hardcoded, the path through the processing pipeline—and thus to the discrete hardware components—may be dynamic or adjustable.

In order to determine the processing pipeline for a given signal processing request, the hardware and software topology, capabilities, and limitations of the system may be modeled as a graph (e.g., a directed graph). The topology of the graph may be static, such that the graph topology completely describes the capabilities of the camera (e.g., each possible processing task may be embodied in the graph topology). A process route through the processing pipeline may be considered as a route of frames (e.g., packets) through the graph in response to a signal processing (or capture) request. In some examples, the signal processing request may include an indication of a capture sensor data type, a processed or output sensor data type, required processing steps (e.g., HDR, denoising, etc.), an output size, etc. As such, based on the signal processing request, the different hardware and/or software that may be used to execute the processing on the captured sensor data may be determined. Once the hardware and/or software—corresponding to processing tasks—are determined, each of the nodes of the graph corresponding to the determined processing tasks may be determined.

The nodes that have connections (e.g., that have associated processing tasks that can happen subsequent one another) may be known, and a cost may be determined between each pair of nodes (e.g., a cost of going from a scaling process to a noise reduction process may be x, and the cost of going from the scaling process to demosaicing step may be y, where x and y may be different). The cost may, in some embodiments, be determined through testing or training, such that samples may be run through the various combinations of processing tasks to determine the costs (e.g., processing costs). In some examples, each node (or processing task) may have a number of different options (e.g., the processing task may be parameterized), and thus there may be a corresponding number of costs between the nodes depending on the different processing options. In such an example, a scaling node may include a possibility of 10% down-scaling, 20% down-scaling, 50% up-scaling, etc., and each different possibility for the scaling node may be represented by an individual cost.

In some examples, the costs may be fixed such that no matter the processing tasks that have already been performed, the cost between two remaining nodes stays constant. In other examples, the costs may be updated after each processing task or stage is completed such that after a processing task is completed (e.g., denoising), the costs between remaining combinations of nodes are updated to reflect the difference in the image data as a result of the processing task. In such examples, scaling—e.g., to downsize the spatial resolution of the sensor data—may reduce costs of processing for one or more of the remaining processing tasks because the size of the sensor data may be reduced, and thus processing may be more efficient.

In some embodiments, in addition to the determined costs, additional criteria (e.g., user-specified criteria) may be used to determine a final cost between nodes of the graph. The additional criteria may include, without limitation, power usage, run-time or latency, image quality, and/or memory bandwidth associated with the image processing request. The additional criteria may be referred to as tradeoff criteria, as an indication of one additional criteria type (e.g., image quality) may have a negative effect on memory usage, for example. As such, as a non-limiting example, where latency or run-time is specified, a cost for scaling may be reduced, such that scaling is more likely to occur earlier on in the processing pipeline to reduce the size and complexity of the sensor data for the remaining processing steps. As another example, where image quality is specified, the cost of scaling may be increased, such that processing tasks (e.g., denoising, demosaicing, etc.) are more likely to be performed prior to any scaling in order to preserve the spatial information of the higher resolutions.

Once the costs or final costs are determined (e.g., as a combination of costs and user-specified criteria), a graph routing algorithm (e.g., Dijkstra, A*, etc.) may be executed to determine an efficient path through the graph for processing the sensor data. In some examples, this path may be the best or shortest path from the captured sensor data, through the processing tasks, and to the output sensor data after processing. Because the costs may be defined based on processing costs and user-specified criteria, the shortest or best path through the graph may not actually be the path with the fastest processing time, but may rather correlate to the additional (e.g., user-specified) criteria of power usage, memory bandwidth, latency, and/or image quality. As such, even if a same graph routing algorithm is used each time for determining the process route through the graph, the determined processing pipelines may be different as a result of the costs determined by the system.

Once a process route is determined, process commands may be generated and transmitted to the discrete hardware components to perform their associated processing tasks. For example, a scaler hardware component may receive a process command (e.g., from a driver) to perform down-scaling of 10%, and then a denoising hardware component may receive a process command to perform denoising, and so on until the process route is complete. Once the process route is complete, the output or processed image may have been generated. This process may be repeated for each signal processing (or capture) request and/or, in some embodiments, this process may be used to program a certain type of signal processing request such that once determined, the processing pipeline may be used over any number of iterations.

With reference to FIG. 1, FIG. 1 is an example signal processing system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether.

Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The signal processing system 100 may include any number of components (e.g., software and/or hardware components) such as a driver 102, a process manager 118 (e.g., that manages any number of processes 120, such as processes 120A-120N), and/or a routing manager 104. The signal processing system 100 may be leveraged to provide commands, messages, and/or control over a hardware architecture (e.g., a signal processing hardware architecture of FIG. 1B), where discrete hardware components of the hardware architecture may receive process commands from the signal processing system 100 (e.g., from a command generator 116 and/or the driver 102). As such, the signal processing system 100 in combination with a hardware architecture may be leveraged to generate and execute instantiations of signal processing pipelines specific to signal processing requests.

The routing manager 104 may include any number of sub components, such as a graph generator 106, a request manager 108, a node selector 110, a cost determiner 112, a graph router 114, and/or a command generator 116. The routing manager 104 may define and/or store a graph topology for the processes 120 of the signal processing system 100, and may determine the routes (e.g., using a graph routing algorithm) through the graph topology to define a signal processing pipeline for a respective signal processing task (e.g., in response to a signal processing or capture request).

The graph generator 106 may—in view of hardware and/or software topology, capabilities, and/or limitations of the system architecture—generate a graph topology of the system architecture. In some embodiments, the graph topology may be static for the system architecture, and may represent a definition of the functionality, operability, and interoperability of the various process components 136 and/or processes 120 of the system. The graph may include any graph type, such as, without limitation, a directed graph, an undirected graph, an unweighted graph, a weighted graph, a directed acyclic graph, a planar directed graph, and/or another graph type.

In some embodiments, the graph (e.g., graph topology 200 of FIG. 2A or graph topology 300 of FIG. 3) may include any number of nodes and edges, where each node may correspond to a process 120 (e.g., a hardware process, a software process, or a combination thereof) and/or a discrete process component 136 (FIG. 1B) and each edge may correspond to a qualified relationship or potential transition between two nodes. For example, the edges may be uni-lateral (e.g., as between camera serial interface (CSI) 204A and lens shader 206 of FIG. 2A) from a first node to a second node, meaning that a process 120 of the second node is capable of being performed on an output of the first node. In some examples, the edges may be bi-lateral (e.g., as between lens shader 206 and memory 214 of FIG. 2A) between the first node and the second node, meaning that the process 120 of the second node is capable of being performed on an output of the first node and a process 120 of the first node is capable of being performed on an output of the second node. In other examples, there may be no edges between nodes (e.g., between CSI 204A and CSI 204B or between noise reduction 208 and HDR shader 216), meaning that processing or exchanging of data between the two nodes may not be compatible with the system architecture.

Figure 2A:
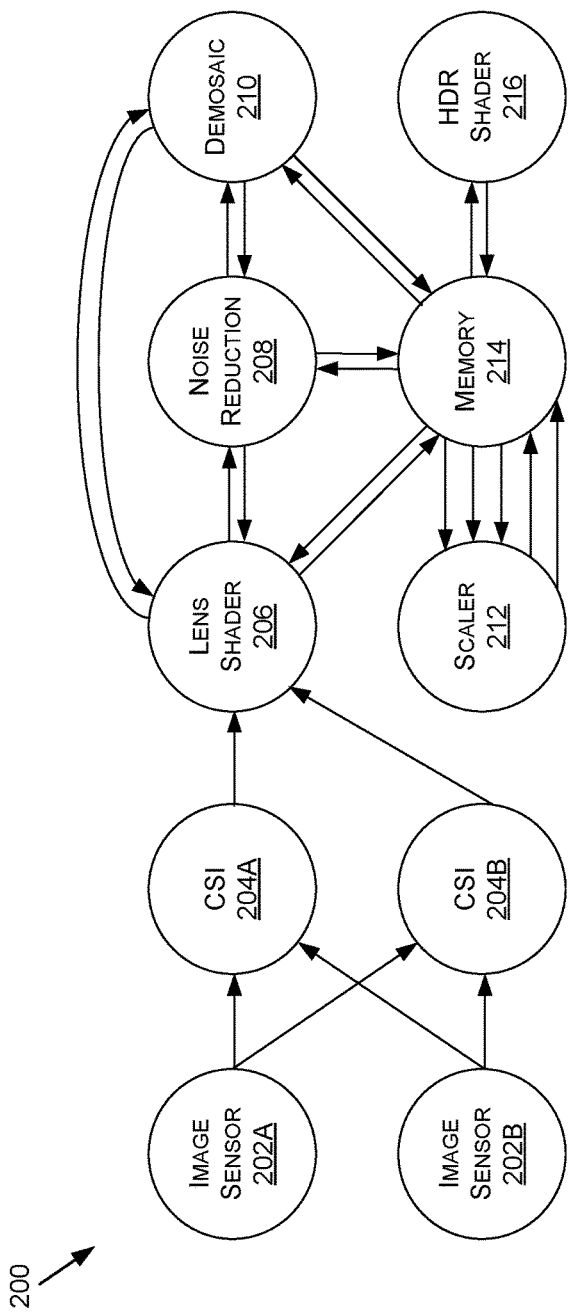
FIG. 2A is an example graph topology for a signal processing system, in accordance with some embodiments of the present disclosure.

In some embodiments, individual nodes may be capable of performing different process options or operations for a process 120. For example, a scaler 212 (FIG. 2A) may be capable of performing down-scaling and/or up-scaling, or down-scaling by different amounts (e.g., 50%, 70%, etc.). In such an example, as illustrated in FIG. 2A, there may be an individual edge for each different process option or operation that may be performed by the scaler 212 on an output from the memory 214. As another example, a number of edges may correspond to a number of different outputs of a preceding node. For a non-limiting example, and with respect to the scaler 212 of FIG. 2A, there may be two edges extending from the scaler 212 to the memory 214. Because the memory 214 may only store the data (e.g., perform a single process option), the reason for two edges may be that the scaler 212 may produce any number of different outputs. For example, when up-scaling, the output may be greater, and thus the cost (e.g., 0.7 in FIG. 2B) may be greater than when down-scaling (e.g., 0.2 in FIG. 2B). As such, having a plurality of edges between two nodes may correspond to different process options for the subsequent node, different outputs from the preceding node, or a combination thereof. Although two or more edges going a single direction are only illustrated with respect to the scaler 212 in FIGS. 2A and 2B, this is for illustrative purposes only, and any of the nodes may include any number of edges between them depending on the system architecture.

The different types of process options for a process 120 may be thought of as input ports for a node, and the different outputs types for a process 120 may be thought of as output ports for a node. As a result, each node may have one or more input ports and one or more output ports, and potential connections between these ports may define the number of edges between the nodes. However, in some examples, during configuration, it may be determined that certain output ports of a node may not be compatible with certain input ports of a subsequent node, and vice versa. In such examples, the number of edges may be defined by the compatible connections between output ports and input ports between nodes.

As such, the combination of the nodes and the edges may define the different process transitions between and among the processes 120 and/or process components 136 of the system. The request manager 108 may receive and/or process requests (e.g., signal processing requests, image processing requests, capture requests, etc.). A request may define constraints for the system, and thus may result in determining—via the node selector 110—the nodes of the graph that should be and/or are required to be used to perform the processing from the request. For example, the request may include a data type for captured sensor data (e.g., a Bayer format for an image sensor), a data type for processed sensor data (e.g., a YUV format for display), a sensor (e.g., image sensor 202A or image sensor 202B, which may have different capabilities, hardware, software, or settings), required processes 120 (e.g., HDR), captured data size (e.g., 2 megapixels (MP), 4 MP, 8 MP, etc.), an output data size or resolution (e.g., 4 MP, 720i, 1080p, 2160p, etc.), a fully or partially defined ordering of process 120 (e.g., an order of image signal processing (ISP), such as to perform scaling before lens shading, etc.), and/or other criteria. Thus, based on a request, the request manager 108—in combination with the node selector 110, in embodiments—may determine the nodes of the graph (e.g., the process 120 and/or the process components 136) that should be executed during processing.

The selected or determined nodes from the node selector 110 may define an instantation of a signal processing pipeline corresponding to the request, and the cost determiner 112 and the graph router 114 may at least partially define the order or path of the signal processing pipeline. For example, the cost determiner 112 may determine costs corresponding to edges of the graph. Costs between various nodes may be determined by testing and/or training. For example, any number of sample sensor data may be passed through the graph along any number of different paths or orderings, and the results may be stored and/or processed. The results may be processed to determine a cost (e.g., a relative cost with respect to other of the processes 120) of performing a process 120 of a node on an output of a connected node.

In some examples, the costs may be determined as fixed costs within the system (e.g., at the graph generation stage with the graph generator 106). In such examples, the costs may not change on a request by request basis, or as a result of node selection. In such examples, the cost determiner 112 may determine the costs and/or may provide the costs to the graph router 114 during routing (e.g., determining the path through the instantiation of the signal processing pipeline).

In other examples, the costs may change for different requests. In such examples, the costs may change based on some or all of the criteria of the request (e.g., a data type and/or size of the captured sensor data). Where a request is for a 4 MP image, the costs may be determined to be different from a request for an 8 MP image (e.g., a downscaling cost for the scaler 212 may be increased for 8 MP as compared to 4 MP, etc.). As such, once the signal processing request is received and/or the nodes are selected by the node selector 110, the cost determiner 112 may determine the costs for each of the edges. In some embodiments, the costs may then stay fixed during the graph routing operation by the graph router 114 (e.g., after each process 120 of an instantiation a signal processing pipeline is executed, the costs may not change).

In other embodiments, the costs may be determined by the cost determiner 112 based on the request and/or the nodes selected by the node selector 110, but the costs may be changed or updated after one or more of the processes 120 of an instantiation of a signal processing pipeline are executed. For example, with respect to FIG. 2B, after lens shading is performed by the lens shader 206, the packets of data that have been updated or modified through lens shading may be different from the packets of data the costs were determined prior to the lens shading. As such, after lens shading, the costs for one or more of the edges may be updated or modified based on the current configuration of the packets of data (e.g., a number of packets of data may be increased, decreased, modified, more complex, etc.). In such an example, where noise reduction 208 may have been a lower cost option prior to lens shading, noise reduction may become a higher cost option after lens shading. The updating or modifying of the costs may be performed to reflect these changes, such that after one or more of the processes 120 (or nodes) of an instantiation of a signal processing pipeline are executed, the costs may be updated for the graph router 114—e.g., executing a graph routing algorithm—to determine a next process(es) 120 to perform.

In some embodiments, for example, the determination of the costs by the cost determiner 112 may include stages. For example, a first stage may include a base cost and a second stage may include a factored cost—e.g., based on the parameters of the signal processing request. As such, the base cost may first be determined based on, for example, the cost of powering on a particular hardware component, or a cost of busy time on the system. The factored cost (e.g., a linear factor) may be determined based on the specific process(es) 120 to be performed. For example, at the start of an instantiation of a pipeline, such as where a scaler is used, the system may determine that an 8 MP (as an example) image is downscaled to 2 MP. This change in the size of the image data may be known by the system, and the change may be used in calculating the factored cost. As such, for an example scaler, a base cost may be X and a factored cost may be, as a non-limiting example, Y*image_size+ Z*memory_layout. As such, the total cost may be a combination of the two. In this way, dynamic costs may be calculated using a set, base cost plus a factored cost determined after each of the process(es) 120 of the instantiation of the pipeline.

In any example, by determining the costs (e.g., through testing and/or training), updating or modifying costs through processing, and/or using the costs for determining a path through a graph to define an instantiation of a signal processing pipeline, overall processing time, efficiency, and quality may be improved. This may be a result of the processes 120 being performed prior and/or subsequent to other of the processes 120 where such sequences provide process-efficient, higher quality results.

In some embodiments, in addition to the costs, additional criteria (e.g., user-specified criteria) may be used by the cost determiner 112 to determine a final cost or total cost between nodes of the graph. The additional criteria may include, without limitation, power usage, run-time or latency, image quality, and/or memory bandwidth associated with the signal processing request. For example, where latency or run-time is specified, a cost for an edge corresponding to the scaler 212 may be reduced, such that scaling is more likely to occur earlier on in the instantiation of the signal processing pipeline to reduce the size and complexity of the sensor data for the remaining processes 120. As another example, where image quality is specified, the cost of using the scaler 212 may be increased, such that processing tasks (e.g., denoising, demosaicing, etc.) are more likely to be performed prior to any scaling in order to preserve the spatial information of the higher resolutions.

To determine the total cost or final cost, the additional criteria may be used to weight the costs for the edges (e.g., where a cost is 0.6 for an edge of the scaler 212, and an additional criteria of decreasing run-time is used, the cost may be weighted by a factor of 0.5, thereby resulting in a final cost of 0.3, making selection of the scaler 212—by the graph router 114—more likely to be earlier on in the pipeline). Similar to what is described above with respect to determining the costs, the impact that different processes 120 have on satisfying the additional criteria (e.g., latency, memory, power, etc.) may be determined through testing and/or training. For example, different processes 120 and/or combinations or ordering of processes 120 may be performed, and measures may be determined for their respective impacts on each of a variety of the additional criteria. In such an example, where down-scaling using the scaler 212 decreases run-time and increases power efficiency, the weighting may be set such that, when decreasing run-time or increasing power efficiency are selected, the cost of one or more edges for the scaler 212 may be reduced. As another example, where demosaicing 210 decreases memory usage (e.g., by decreasing the overall size of the sensor data) and the HDR shader 216 increases memory usage, the weighting may be set such that, when decreasing memory usage is selected, the cost of one or more edges for the demosaicing 210 may be reduced and the cost of one or more edges for the HDR shader 216 may be increased. In non-limiting examples, this relationship may be represented—for each edge—as in equation (1), below:

$$C_F = W_{AC} * C_E \qquad (1)$$

where $C_F$ is the final cost for an edge, $W_{AC}$ is the weight of the additional criteria with respect to the edge, and $C_E$ is the cost for the edge. As such, as an instantiation of a signal processing pipeline is generated, the final costs, $C_F$, corresponding to each of the edges (and thus the processes 120) may be represented by equation (2), below:

$$C_{F\_Total} = W_{AC\_1} * C_{E_1} W_{AC\_2} * C_{E\_2} + \ldots W_{AC\_N} * C_{E\_N} \qquad (2)$$

where $C_{F\_Total}$ is the total final cost for the signal processing pipeline (e.g., through process 1-N), $W_{AC\_1}$ is the weight of the additional criteria with respect to the edge for a first process 120A, $C_{E\_1}$ is the cost for the edge for the first process 120A, $W_{AC\_2}$ is the weight of the additional criteria with respect to the edge for a second process 120B, $C_{E\_2}$ is the cost for the edge with respect to the second process 120B, and so on.

The graph router 114 may determine the route or path through the graph (e.g., after node selection and using the costs from the cost determiner) to define the order of the processes 120—and thus the activation of the process components 136—for an instantiation of a signal processing pipeline. Because the costs may be determined and weighted, in some embodiments, based on the additional criteria, the graph router 114 may determine a route that decreases run-time, decreases power usage, decreases memory usage, improves or satisfies image quality requirements, or some combination thereof. Where no additional criteria are specified, the costs may be used to increase the efficiency of, or optimize, the signal processing pipeline to decrease run-time. Where the additional criteria are specified, the final costs may be used to configure the signal processing pipeline to satisfy the additional criteria while also, at least as a second focus, decreasing run-time.

The graph router 114 may execute a graph routing algorithm to determine a path or route through the graph. The graph routing algorithm may include, as non-limiting examples, a global routing algorithm, a decentralized routing algorithm, a static routing algorithm, a dynamic routing algorithm, Dijkstra's algorithm, an A* search algorithm, a distance vector algorithm (e.g., using the Bellman-Ford equation), a shortest path algorithm, a Floyd-Warshall algorithm, a Viterbi algorithm, Johnson's algorithm, and/or a another type of routing algorithm. Once the path is determined through the nodes (e.g., a virtual signal processing pipeline is determined), a signal processing pipeline may be instantiated that is defined by the path (e.g., path 220 of FIG. 2C through the nodes from the graph topology 200 of FIG. 2A). As such, the processes 120 and their respective process components 136 that correspond to the nodes may define the instantiation of the signal processing pipeline (e.g., a physical signal processing pipeline that corresponds to the virtual signal processing pipeline).

Although described as separate components, the graph router 114 and the cost determiner 112, in embodiments, may be a same component (e.g., software component). For example, the graph router 114 and the cost determiner 112 may be cooperating units of a single component running in tandem.

In some embodiments, a goal function may be used to determine whether a desired target state—as indicated in a signal processing request—has been achieved. For example, a current state (e.g., determined from a current path through a signal processing pipeline) may be compared to a desired target state. Where the current state is not within the desired target state, a different path may be determined.

The command generator 116—in combination with or as part of the driver 102, in embodiments—may generate and transmit commands to the process components 136 for executing the processes 120 according to the instantiation of the signal processing pipeline. For example, once the signal processing pipeline is defined, commands may be generated and transmitted to each of the process components 136 in order. As such, with respect to FIG. 2C, assuming the CSI 204A is process 120A corresponding to a first of the process components 136, the lens shader 206 is process 120B corresponding to a second of the process component 136, and so on, the driver 102 and/or command generator 116 may generate and transmit commands first to the first process component 136 corresponding to the CSI 204A, then to the second process component 136 corresponding to the lens shader 206, and so on, until the packets of data corresponding to the sensor data (e.g., image data when generated by the image sensor 202A) have been processed through each of the processes 120A (e.g., the image sensor 202, that captures the sensor data) to 120G (e.g., the scaler 212 that scales the sensor data).

The driver 102 may implement camera logic by queuing the signal processing requests, capture requests, and/or other request types, controlling the graph router 114 and/or other components of the routing manager 104, executing the capture routes (e.g., using the command generator 116), scheduling work or tasks to the process components 136, and/or may perform other tasks.

The process manager 118 may manage each of the processes 120 (in combination with the driver 102 and/or the routing manager 104, in embodiments). The process manager 118 may aid in delivering the commands and the data packets (e.g., representing the sensor data) to the process components 136 executing the processes 120. For example, each of the processes 120 may include logic. The logic may be simple logic, such that the commands from the command generator 116 include an instruction of a particular process option to perform (e.g., where the process is scaling, the logic may receive a command to scale 50%, and the logic may execute the 50% scaling using the process component 136 for the scaler 212). The logic may include a software driver, in some embodiments. In contrast to conventional systems, where complex logic is required to analyze a current configuration of the sensor data to determine the processes that have already been performed, the logic of the processes 120 may be configured to receive a command and execute the command. This may be a result of the signal processing system 100 (e.g., the driver 102, the routing manager 104, etc.) managing the processes 120 that have been performed, and the configuration of the sensor data throughout, so that the logic of the processes 120 may receive the sensor data and the process command and execute the process 120 using the process component 136.

In addition, by using such an architecture, debugging may be more efficient as identifying bugs may be more-straight forward than conventional approaches. For example, because the driver 102 and/or the routing manager 104 are executing each of the processes 120, and are involved at before and after each process 120, identifying where a failure or bug is in the system is less computationally expensive. In addition, because the output of the graph router may be a set of instructions to be executed, it is known what is to be executed and in what order (e.g., in contrast to conventional fixed function pipelines that do not separate command generation from the driver—thereby spreading command generation among various software blocks, making an understanding of the full list and order of commands difficult to track). To debug, sensor data may be analyzed prior to input and at the output of each of the processing tasks and, when an issue is determined, it may be attributed to a particular process component 136. As such, the location of the fault may be quickly determined, and focus may be put on the particular process component 136 at the outset rather than requiring testing of each individual process component as in conventional systems.

With respect to image processing, the processes 120 may include, without limitation, hot pixel correction, demosaicing, noise reduction, shading correction, color correction, tone curve adjustment, edge enhancement, HDR shading, scaling, CSI, cropping, geometric correction, and/or other processes. With respect to audio processing, the processes 120 may include active noise control, noise cancellation, speech synthesis, delay, echo, equalization, filtering, pitch shift, time stretching, modulation, compression, and/or other processes. Similarly, for other types of signal processing, any number of different processes 120 may be employed.

Figure 1B:
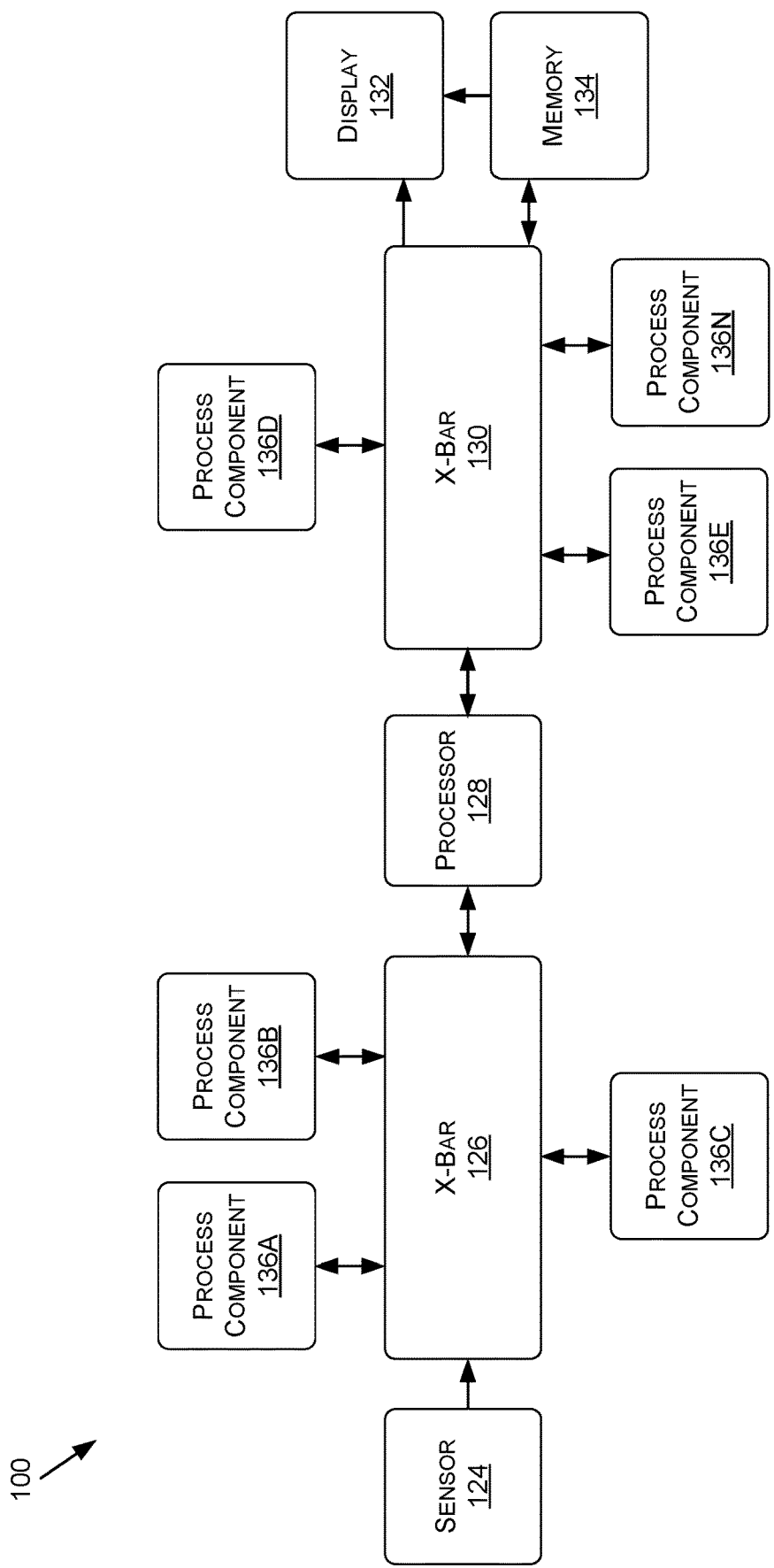
FIG. 1B is an example hardware distribution for a signal processing system, in accordance with some embodiments of the present disclosure.

Now referring to FIG. 1B, FIG. 1B is an example hardware distribution for a signal processing system 100, in accordance with some embodiments of the present disclosure. In some embodiments, such as where the signal processing system 100 is for image processing, the hardware distribution and/or the software of the signal processing system 100 may represent an image signal processor. The example hardware distribution of the signal processing system 100 is not intended to be limiting, and is for example purposes only. For example, there many any number (0-N) of process components 136, any number of sensors 124, any number of processors 128, any number of X-bars 126, 130, any number of output devices (e.g., memory 134 or display 132), and/or any other components. In addition, there may be additional or alternative components other than those illustrated in FIG. 1B. As such, the hardware and the distribution thereof for the signal processing system 100 in FIG. 1B is for illustrative purposes only.

Figure 2B:
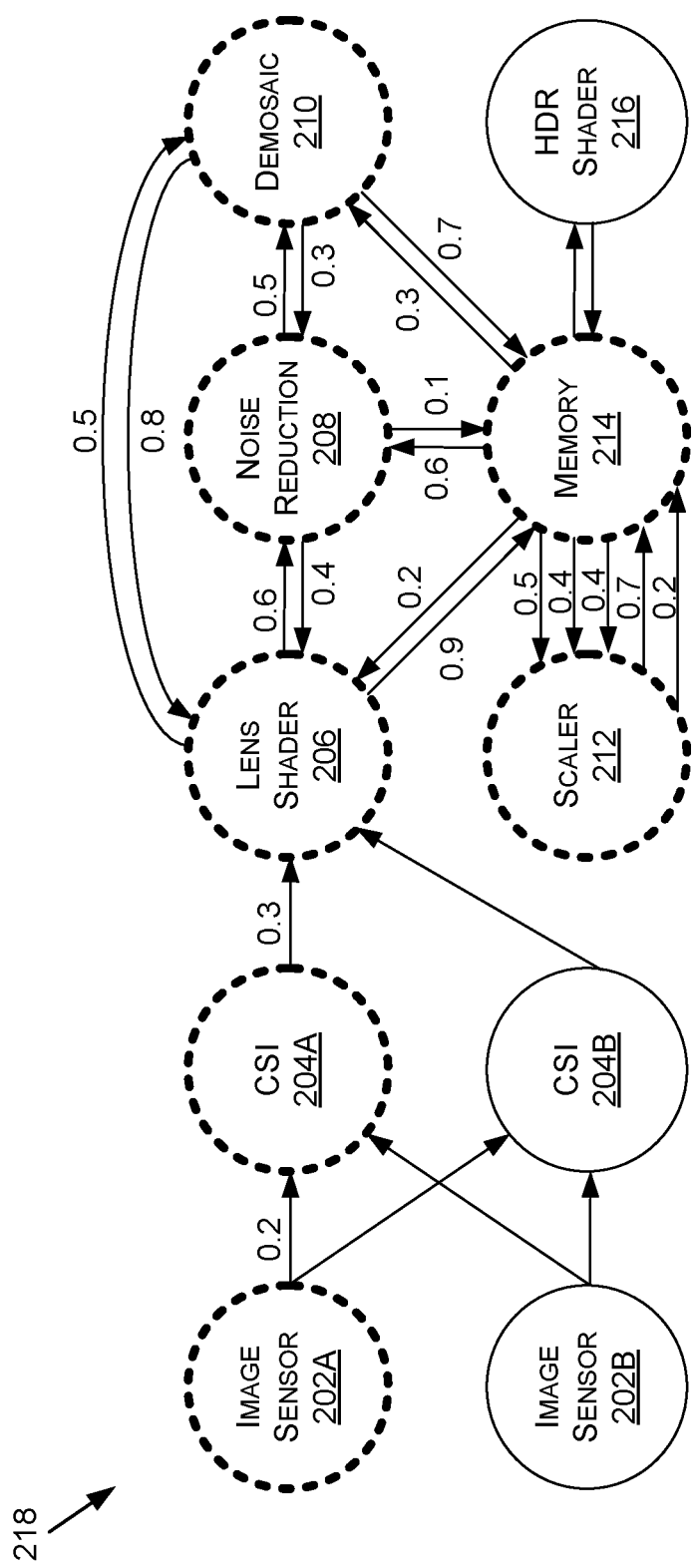
FIG. 2B is an example node selection within the graph topology of FIG. 2A for an image processing request, in accordance with some embodiments of the present disclosure.
Figure 2C:
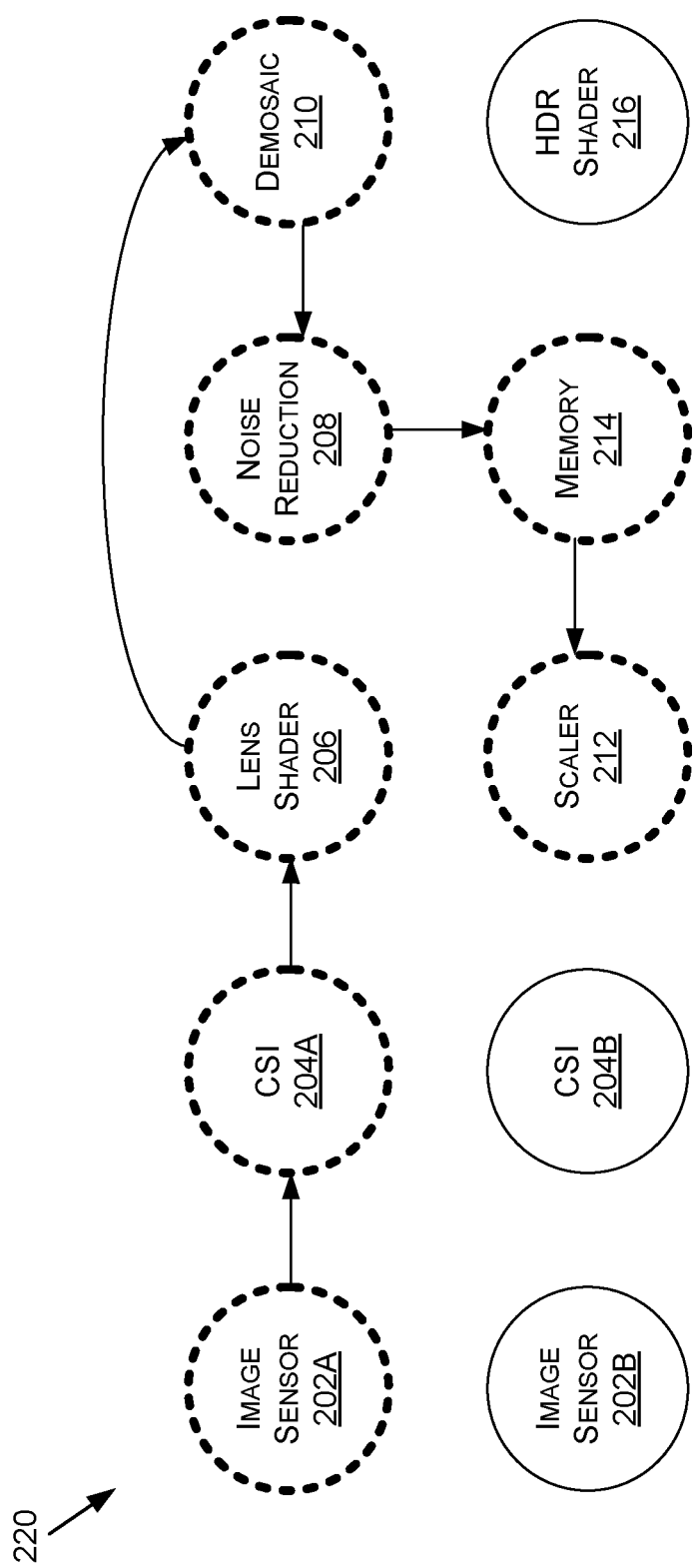
FIG. 2C is an example path through the selected nodes of FIG. 2B for the image processing request, in accordance with some embodiments of the present disclosure.

The sensor 124 may generate sensor data, and the sensor data may be processed by the signal processing system 100. For example, different process components 136 may be communicatively coupled via the X-bars 126 and 130 (e.g., a bus) as well as the processor 128 (e.g., an area processor, application processor, image signal processor, a camera processor, etc.). As described herein, some of the process components 136 may not be compatible, such that some or all of the outputs from a process component 136A, for example, may not be usable as an input to a process component 136D. At least some of the process components 136 may each represent a discrete hardware component and/or software component. Where the process components 136 include hardware, the hardware of the process component 136 may include a discrete component (e.g., a discrete component on a SoC) that may be configured to execute a single process 120 (e.g., including any number or process options). As such, the X-bars 126 and 130 may route the sensor data, commands, and/or other signals—in combination with the processor 128, in embodiments—between and among the discrete process components 136 on a SoC. Before, during, and/or after execution of an instantiation of a signal processing pipeline, the sensor data may be stored in memory 134, displayed on a display 132, and/or a combination thereof. For example, during processing (e.g., as indicated by FIGS. 2A-2C), the sensor data may be stored in the memory 134. In addition, in some examples, the sensor data may be displayed on the display 132 (e.g., as a preview).

As an example, the driver 102, the process manager 118, and/or the routing manager 104 may be executed by the processor(s) 128, and the instructions for each may be stored in memory 134. The logic corresponding to the processes 120 may be stored in the memory 134, and/or may be stored in memory of the process components 136 themselves. As such, the software from FIG. 1A may be executed, as an example, using the hardware distribution of FIG. 1B.

Now referring to FIGS. 2A-2C, FIGS. 2A-2C illustrate an example graph topology 200 for a signal processing system 100, an example node selection 218 within the graph topology 200, and a path 220 through the selected nodes within the graph topology 200. For example, the graph topology 200 of FIG. 2A may represent the hardware, software, capabilities, and limitations of a camera for performing image signal processing. The camera may include image sensors 202, CSIs 204, a lens shader 206, noise reduction 208, demosaicing 210, scaler 212, memory 214, HDR shader 216, and/or additional or alternative nodes (defining processes 120 for respective process components 136) other than those illustrated in FIG. 2B. The graph topology 200 may be static, such that all possible (e.g., compatible) communication paths, interoperability, and functionality between and among the nodes (e.g., as illustrated by edges) is defined by the graph topology. The graph topology 200 may, in some embodiments, be generated by the graph generator 106 of the signal processing system 100.

FIG. 2B may represent node selection 218 within the graph topology 200, in addition to costs associated with each of the edges between and among the selected nodes. For example, based on an image processing request, a capture request, and/or another request type (e.g., received and/or processed by the request manager 108), the nodes for inclusion in the processing of the sensor data may be determined (e.g., by the node selector 110). As a result a particular example request, the image sensor 202A, CSI 204A, lens shader 206, noise reduction 208, demosaicing 210, scaler 212, and memory 214 may be selected. In addition, based on the request (e.g., for a particular captured image type, a requested processed image type, an additional criteria, etc.), the cost determiner 112 may determine the costs—as illustrated with respect to each of the edges between each of the selected nodes in FIG. 2B. Using the costs and the selected nodes, the graph router 114 may determine, using a graph routing algorithm, a path 220 through the nodes. The resulting path, in the example of FIG. 2C, may include packets of data representing the image data of the captured image type (e.g., image format, size, etc.) being generated by the image sensor 202A, being transmitted to the CSI 204A for interconnecting the image sensor 202A to the processor (e.g., processor 128), then being transmitted to the lens shader 206 for modifying origin and/or direction of a ray from the image sensor 202A, then being transmitted to demosaicing 210 for image reconstruction, then being transmitted for noise reduction 208 to remove noise from the image signal, then being transmitted and stored in the memory 214, and then being transmitted to the scaler 212. After the scaler 212, in some examples, the resulting packets of data may be displayed on a display, stored in memory (e.g., the memory 214), and/or transmitted to another location (e.g., to another device), as non-limiting examples. Each of these stages or processes 120 may be triggered by the command generator 116 and/or the driver 102 by transmitting a command to logic of the processes 120 within the process manager 118 and associated with the process components 136. As a result, the path 220 may define the instantiation of the signal processing pipeline for processing an image captured by the image sensor 202A (e.g., in response to the request).

Figure 3:
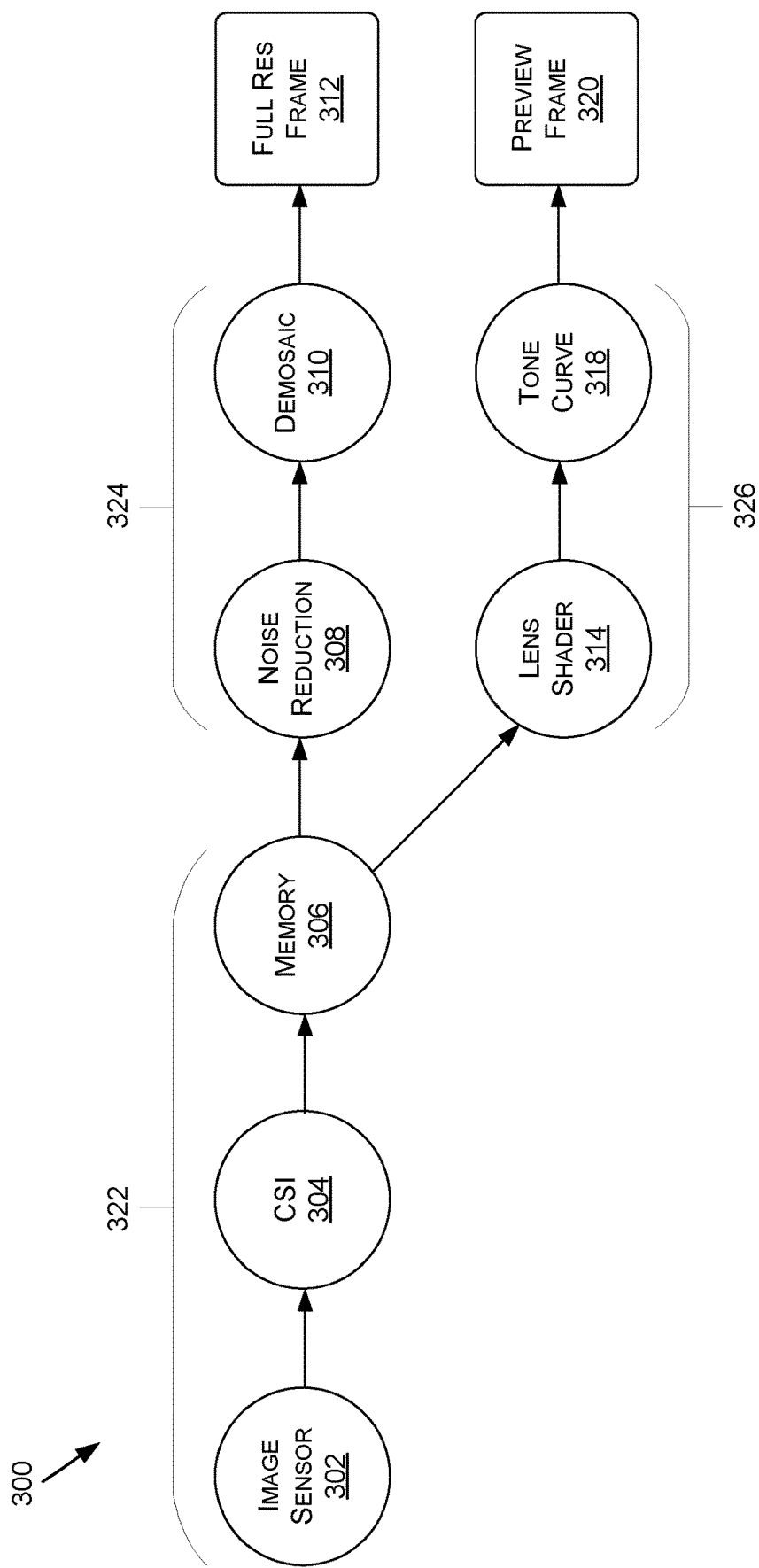
FIG. 3 is an example graph topology including a pivot node, in accordance with some embodiments of the present disclosure.

Now referring to FIG. 3, FIG. 3 is an example graph topology 300 including a pivot node, in accordance with some embodiments of the present disclosure. For example, in some instances, a request may be for two or more different types of outputs. In an image processing example, a request may include a request for a full resolution frame 312 (e.g., for storage and later high-fidelity use) and a preview frame 320 (e.g., for previewing the processed image, such as for accuracy or appearance). In such examples, the paths for the sensor data to the first output type and the second output type may share some segments but differ in others. For example, at a particular point through the processing of the image data, the paths may diverge (e.g., at a pivot node, such as the memory 306 in the example of FIG. 3). As such, the captured image data from the image sensor 302 may pass to the CSI 304, then to memory 306, prior to pivoting to pass through to noise reduction 308 and demosaicing 310 for the full resolution frame 312 and to pass through lens shader 314 and tone curve 318 for the preview frame.

In examples where a pivot node is used, the path up to the pivot node may include a first path 322, the path from the pivot node to the full resolution frame 312 may include a second path 324, and the path from the pivot node to the preview frame 320 may include a third path 326. Each path 322, 324, and 326 may include any number of possible processes 120. As such, for each path 322, 324 and 326, the processes described herein with respect to arriving at the path 220 may be performed. For example, each the possible processes 120 for the first path 322 may undergo node selection, cost determination, and graph routing, each of the possible processes 120 for the second path 324 may undergo node selection, cost determination, and graph routing, and so on. In addition, although only two paths are included off of the pivot node, and only one pivot node is illustrated, this is not intended to be limiting. Any number of paths and/or pivot nodes may be used, depending on the embodiment, without departing from the scope of the present disclosure.

Figure 4:
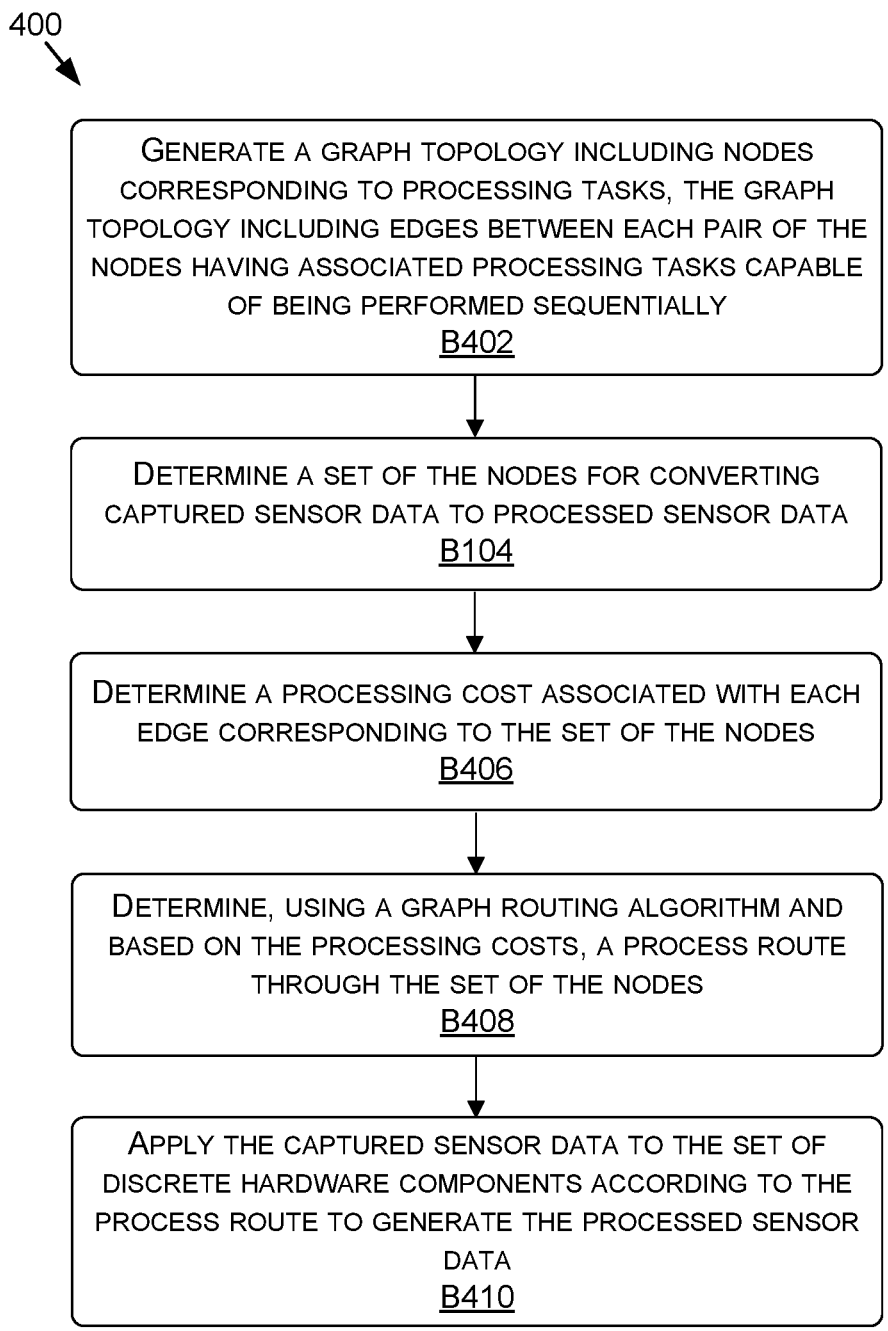
FIG. 4 is a flow diagram illustrating a method for generating an image processing pipeline, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the systems of FIGS. 1A and 1B. However, this method may additionally or alternatively be executed by any one system, or any combination of systems, including, but not limited to, those described herein.

FIG. 4 is a flow diagram illustrating a method 400 for generating an image processing pipeline, in accordance with some embodiments of the present disclosure. The method 400, at block B402, includes generating a graph topology including nodes corresponding to processing tasks, the graph topology including edges between each pair of the nodes having associated processing tasks capable of being performed sequentially. For example, the graph generator 106 may generate the graph topology 200 including the nodes and the edges, as described herein.

The method 400, at block B404, includes determining a set of the nodes for converting captured sensor data to processed sensor data. For example, the node selector 110 may determine the node selection 218 for converting the captured sensor data to the processed sensor data.

The method 400, at block B406, includes determining a cost associated with each corresponding to the set of the nodes. For example, the cost determiner 112 may determine costs corresponding to each of a set of the edges corresponding to the set of the nodes.

The method 400, at block B408, includes determining, using a graph routing algorithm and based on the processing costs, a process route through the set of the nodes. For example, the graph router 114, using the costs and the set of the nodes, may determine a process route or path 222 through the set of the nodes. This process may be executed using a graph routing algorithm, such as but not limited to those described herein. In some embodiments, the process route may be determined to be the process route with the lowest cumulative cost.

The method 400, at block B410, includes applying the captured sensor data to a set of discrete hardware components according to the process route to generate the processed sensor data. For example, the captured sensor data may be applied to the set, or subset, of the entirety of the discrete hardware components (e.g., the process components 136) according to (e.g., in an order dictated by) the process route or path 222 to generate the processed sensor data.

In some examples, and with reference to the method 400, each of blocks 402, 404, 406, 408, and 410 may be execute responsive to a reception of a signal processing request (e.g., by the request manager 108). In some embodiments, blocks 402, 404, 406, 408, and 410 may be performed for each signal processing request received.

Figure 5:
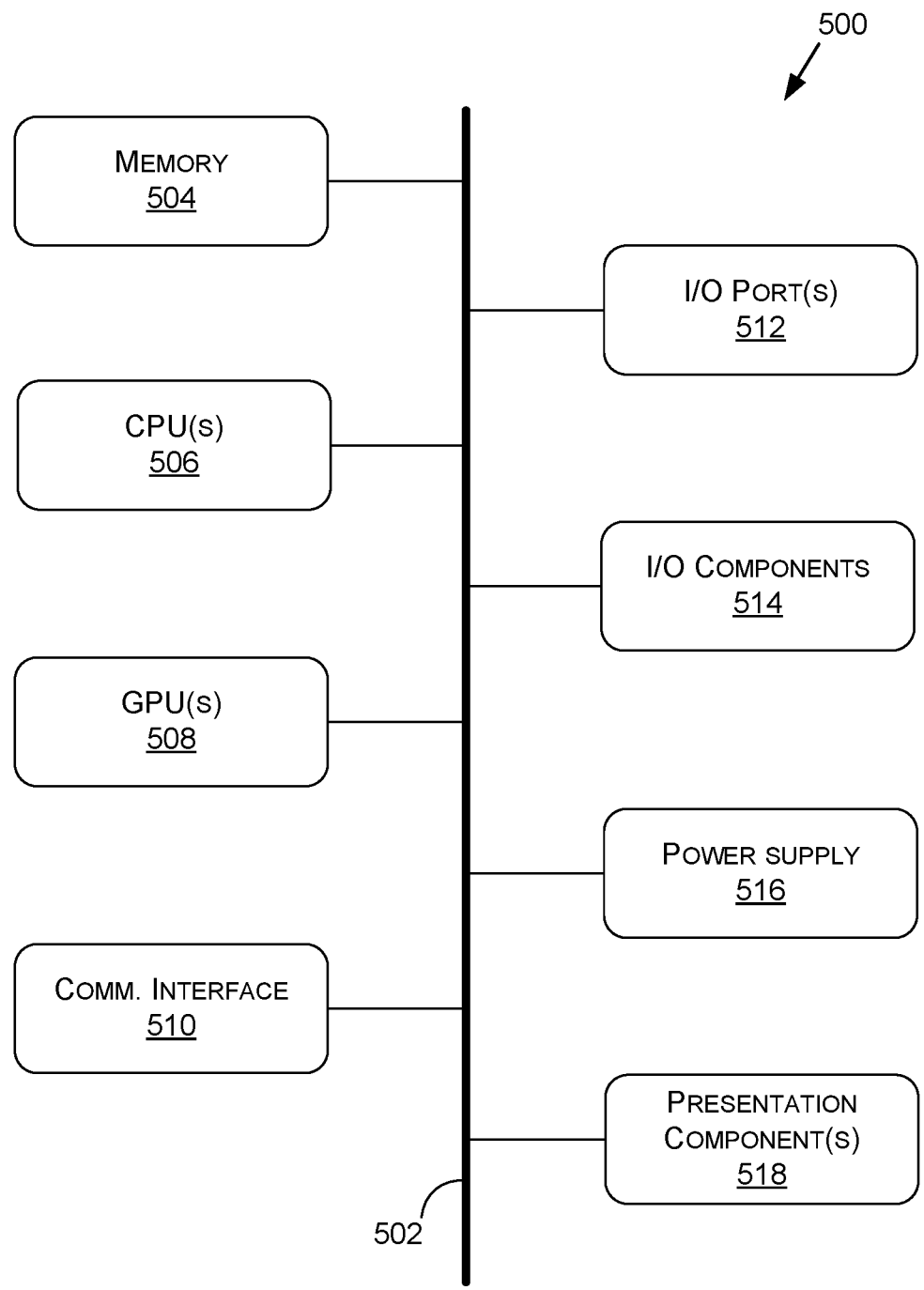
FIG. 5 is a block diagram of an example computing device suitable for use in implementing some embodiments of the present disclosure.

FIG. 5 is a block diagram of an example computing device 500 suitable for use in implementing some embodiments of the present disclosure. Computing device 500 may include a bus 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, and one or more presentation components 518 (e.g., display(s)).

Although the various blocks of FIG. 5 are shown as connected via the bus 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 5.

The bus 502 may represent one or more busses, such as an address bus, a data bus, a control bus, or a combination thereof. The bus 502 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 506 may be configured to execute the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an ARM processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

The GPU(s) 508 may be used by the computing device 500 to render graphics (e.g., 3D graphics). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data. The display memory may be included as part of the memory 504. The GPU(s) 708 may include two or more GPUs operating in parallel (e.g., via a link). When combined together, each GPU 508 may generate pixel data for different portions of an output image or for different output images (e.g., a first GPU for a first image and a second GPU for a second image). Each GPU may include its own memory, or may share memory with other GPUs.

In examples where the computing device 500 does not include the GPU(s) 508, the CPU(s) 506 may be used to render graphics.

The communication interface 510 may include one or more receivers, transmitters, and/or transceivers that enable the computing device 700 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   one or more processing units comprising processing circuitry to:
   determine, based at least on a processing request corresponding to input data, at least a first node corresponding to a first processing task and a second node corresponding to a second processing task, wherein the first node is coupled to the second node using a first edge that corresponds to a first process option of the first processing task, and wherein the first node is coupled to the second node using a second edge that corresponds to a second process option of the first processing task;
   determine a difference between a first cost associated with the first edge and a second cost associated with the second edge;
   select the first edge based at least on the processing request and the difference; and
   process the input data by, at least in part, executing the first process option of the first processing task to generate processed data.

2. The system of claim 1, wherein at least one of the determination of the difference and the selection of the first edge are executed using a graph routing algorithm.

3. The system of claim 1, wherein the first node corresponds to a first discrete hardware unit configured to execute the first processing task and the second node corresponds to a second discrete hardware unit configured to execute the second processing task.

4. The system of claim 1, wherein the first edge between the first node and the second node is included in a processing route for the input data, and the processing route further includes one or more additional edges corresponding to one or more addition nodes.

5. The system of claim 1, wherein the processing request is indicative of a process criteria, and the processing circuitry is further to determine at least one of the first cost or the second cost based at least in part on the process criteria.

6. The system of claim 5, wherein the process criteria corresponds to at least one of power usage, latency, data quality, or memory bandwidth.

7. The system of claim 1, wherein:
   the first edge is associated with a first type of processed data sent from the first node to the second node, the first type of processed data being associated with the first process option of the first processing task; and
   the second edge is associated with a second type of processed data sent from the first node to the second node, the second type of processed data being associated with the second process option for the first processing task, the second type of processed data being different from the first type of processed data.

8. A processor comprising processing circuitry to:
   determine, based at least on a processing request corresponding to input data, at least a first node corresponding to a first processing task and a second node corresponding to a second processing task, wherein the first node is coupled to the second node using a first edge corresponding to a first process option of the first processing task, and wherein the first node is coupled to the second node using a second edge corresponding to a second process option of the first processing task;
   determine a difference between a first cost associated with the first edge and a second cost associated with the second edge;
   select the first edge based at least on the processing request and the difference; and
   process the input data by, at least in part, executing the first process option of the first processing task to generate processed data.

9. The processor of claim 8, wherein at least one of the determination of the difference and the selection of the first edge are executed using a graph routing algorithm.

10. The processor of claim 8, wherein the first node corresponds to a first discrete hardware unit configured to execute the first processing task and the second node corresponds to a second discrete hardware unit configured to execute the second processing task.

11. The processor of claim 8, wherein the first edge between the first node and the second node is included in a processing route for the input data, and the processing route further includes one or more additional edges corresponding to one or more addition nodes.

12. The processor of claim 8, wherein the processing request is indicative of a process criteria, and the processing circuitry is further to determine at least one of the first cost or the second cost based at least in part on the process criteria.

13. The processor of claim 12, wherein the process criteria corresponds to at least one of power usage, latency, data quality, or memory bandwidth.

14. The processor of claim 8, wherein the first node and the second node are included in a processing route for the input data, and the processing route includes a first path to generate a first processed data and a second path to generate a second processed data different from the first processed data.

15. A method comprising:
determining, based at least on a processing request corresponding to input data, at least a first node corresponding to a first processing task and a second node corresponding to a second processing task, wherein the first node is coupled to the second node using a first edge corresponding to a first process option of the first processing task, and the first node is coupled to the second node using a second edge corresponding to a second process option of the first processing task;
determining a difference between a first cost associated with the first edge and a second cost associated with the second edge;
selecting the first edge based at least on the processing request and the difference; and
processing the input data by, at least in part, executing the first process option of the first processing task to generate processed data.

16. The method of claim 15, wherein at least one of the determining the difference and the selecting the first edge are executed using a graph routing algorithm.

17. The method of claim 15, wherein the first node corresponds to a first discrete hardware unit configured to execute the first processing task and the second node corresponds to a second discrete hardware unit configured to execute the second processing task.

18. The method of claim 15, wherein the first edge between the first node and the second node is included in a processing route for the input data, and the processing route further includes one or more additional edges corresponding to one or more addition nodes.

19. The method of claim 15, wherein the processing request is indicative of a process criteria, and the method further comprises determining at least one of the first cost or the second cost based at least on the process criteria.

20. The method of claim 19, wherein the process criteria corresponds to at least one of power usage, latency, data quality, or memory bandwidth.

* * * * *